United States Patent
Jeon

(10) Patent No.: US 12,407,051 B2
(45) Date of Patent: Sep. 2, 2025

(54) BATTERY HOUSING AND BATTERY SYSTEM INCLUDING THE SAME

(71) Applicant: SK ON CO., LTD., Seoul (KR)

(72) Inventor: Hae Ryong Jeon, Daejeon (KR)

(73) Assignee: SK ON CO., LTD., Seoul (KR)

( * ) Notice: Subject to any disclaimer, the term of this patent is extended or adjusted under 35 U.S.C. 154(b) by 578 days.

(21) Appl. No.: 17/853,437

(22) Filed: Jun. 29, 2022

(65) Prior Publication Data

US 2022/0416344 A1 Dec. 29, 2022

(30) Foreign Application Priority Data

Jun. 29, 2021 (KR) .................. 10-2021-0084428

(51) Int. Cl.
| | |
|---|---|
| *H01M 50/229* | (2021.01) |
| *H01M 10/613* | (2014.01) |
| *H01M 50/211* | (2021.01) |
| *H01M 50/222* | (2021.01) |
| *H01M 50/227* | (2021.01) |
| *H01M 50/233* | (2021.01) |

(52) U.S. Cl.
CPC ....... *H01M 50/229* (2021.01); *H01M 10/613* (2015.04); *H01M 50/211* (2021.01); *H01M 50/222* (2021.01); *H01M 50/227* (2021.01); *H01M 50/233* (2021.01)

(58) Field of Classification Search
CPC ............. H01M 50/222; H01M 50/227; H01M 50/229; H01M 50/233; H01M 10/613
See application file for complete search history.

(56) References Cited

U.S. PATENT DOCUMENTS

| | | | |
|---|---|---|---|
| 2012/0121956 A1* | 5/2012 | Park ..................... | H01M 50/103 429/99 |
| 2014/0030576 A1* | 1/2014 | Schaefer ............. | H01M 10/647 429/120 |
| 2021/0351455 A1* | 11/2021 | Kim ........................ | B60L 50/66 |

FOREIGN PATENT DOCUMENTS

| | | | |
|---|---|---|---|
| JP | 4809374 | * | 11/2011 |
| KR | 10-2009-0042608 A | | 4/2009 |
| KR | 10-2012-0051475 A | | 5/2012 |
| KR | 10-2018-0060997 A | | 6/2018 |
| KR | 10-2020-0033783 A | | 3/2020 |
| KR | 10-2021-0063245 A | | 6/2021 |
| WO | WO 2020-060341 | * | 3/2020 |

OTHER PUBLICATIONS

English translation of JP Publication 4809374, Nov. 2011.*
Office Action for KR Patent Application No. 10-2021-0084428 issued by the Korean Patent Office on Jul. 23, 2025.

* cited by examiner

*Primary Examiner* — Brittany L Raymond
(74) *Attorney, Agent, or Firm* — IP & T GROUP LLP

(57) ABSTRACT

A battery housing according to exemplary embodiments may include a bottom part, and a first sidewall part and a second sidewall part which are connected to the bottom part and face each other. Any one of the bottom part, the first sidewall part, and the second sidewall part may include a carbon fiber reinforced plastic (CFRP) sheet, and another of the bottom part, the first sidewall part, and the second sidewall part may include a glass fiber reinforced plastic (GFRP) sheet.

18 Claims, 3 Drawing Sheets

[FIG. 1]
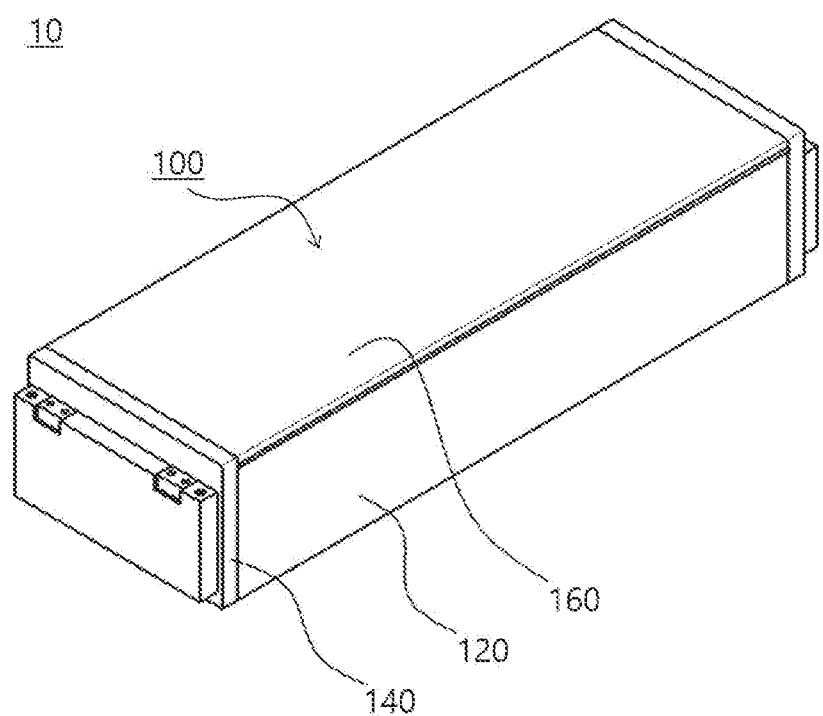

[FIG. 2]
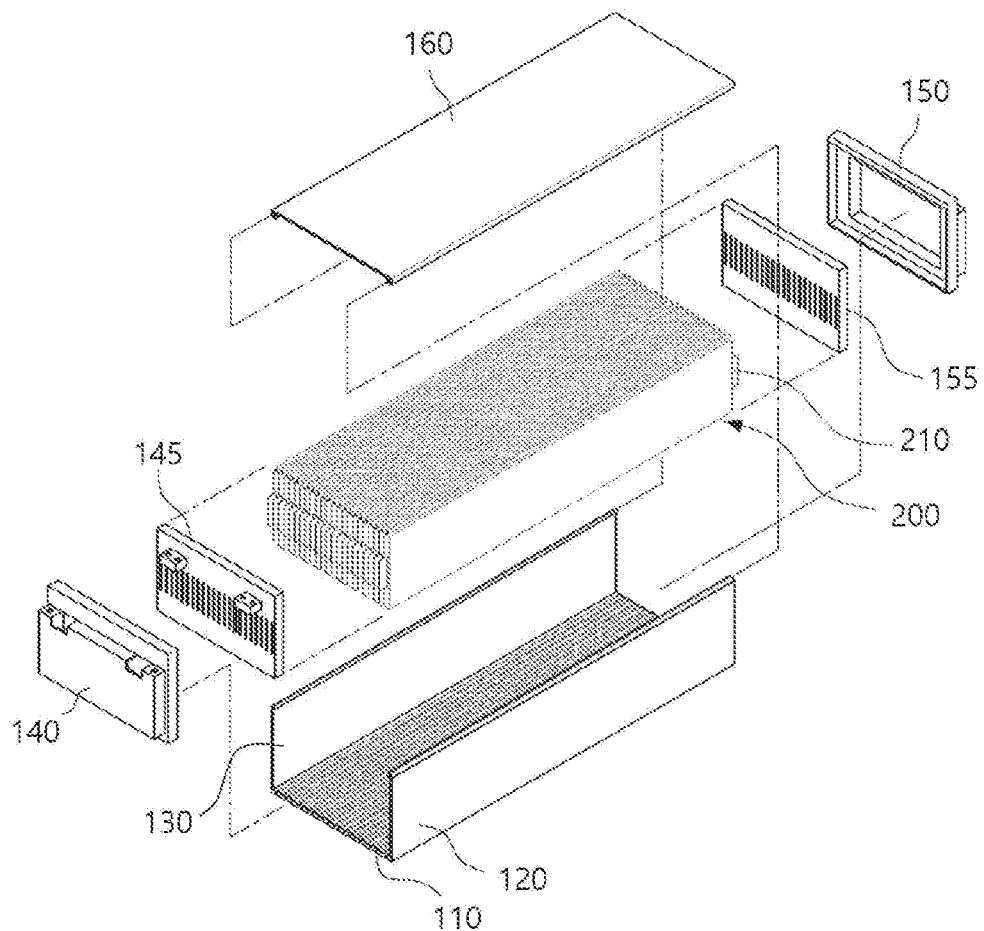
[FIG. 3]
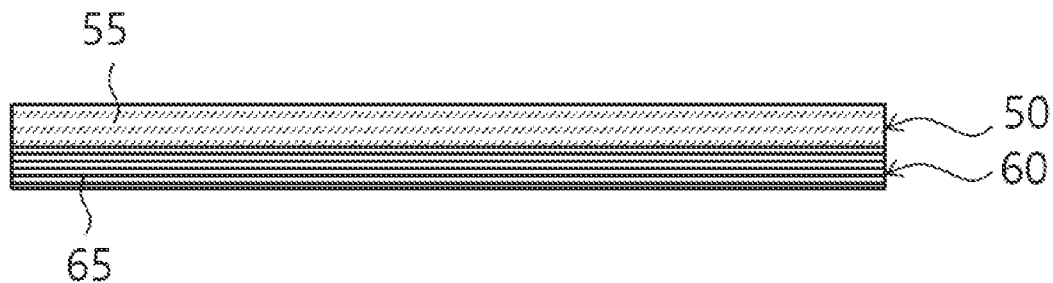

[FIG. 4]
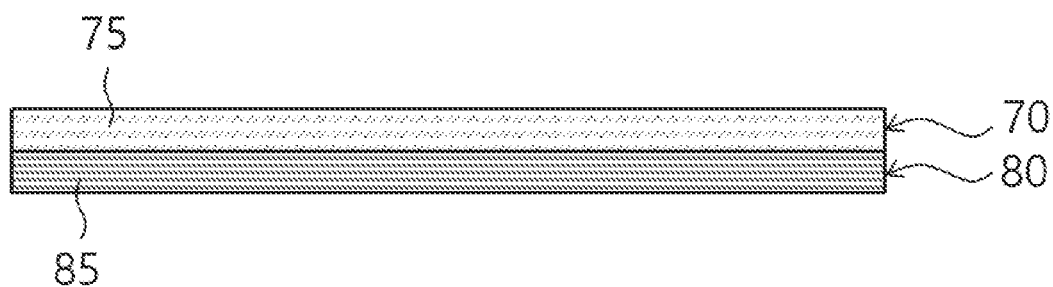

BATTERY HOUSING AND BATTERY SYSTEM INCLUDING THE SAME

CROSS-REFERENCE TO RELATED APPLICATION(S)

This application claims benefit of priority to Korean Patent Application No. 10-2021-0084428 filed on Jun. 29, 2021 in the Korean Intellectual Property Office, the disclosure of which is incorporated herein by reference in its entirety.

BACKGROUND OF THE INVENTION

1. Field of the Invention

The present invention relates to a battery housing and a battery system including the same, and more particularly, to a battery housing which uses a plastic material and a battery system including the battery housing.

2. Description of the Related Art

A secondary battery is a battery which can be repeatedly charged and discharged, and includes, for example, a lithium secondary battery, a nickel-cadmium battery, a nickel-hydrogen battery and the like.

A low-capacity secondary battery may be used in small electronic devices such as a cellular phone, a laptop computer, a camcorder, and the like as a power source thereof, whereas a high-capacity secondary battery may be used in large electronic devices such as a hybrid vehicle, and the like as a power source thereof.

For example, the secondary battery may include an electrode assembly including a cathode, an anode, and a separation membrane interposed between the cathode and the anode; and a case in which the electrode assembly is housed. In addition, the secondary battery may include electrode leads which are electrically connected to the electrode assembly and protrude to an outside of the case.

For example, the battery may be charged and discharged through an electrochemical reaction between the cathode, the anode and an electrolyte. Herein, the electrolyte may be injected into the case.

The case has a shape including a cylindrical shape, a prismatic shape, a pouch shape, or the like, and may have various shapes depending on the use, the application field, etc. of the secondary battery.

In order to provide a secondary battery having a high capacity and a high energy density, a plurality of battery cells (secondary batteries) may be combined with each other in series and/or in parallel to form a battery module. For example, the battery module may be formed by connecting electrode leads of the battery cells with each other.

For example, the battery module may include a battery module case for housing the battery cells.

Meanwhile, the battery module case should be able to protect the battery cells from external influences such as mechanical, thermal, and electrical shocks, etc., for example. In addition, the battery module case should have mechanical properties so as to protect an outer portion thereof from dangerous influences caused by a battery cell in which a malfunction occurs, and heat dissipation characteristics (i.e., cooling characteristics) in order to prevent abnormal problems due to an increase in internal temperature.

For example, the battery module case may include a metal (e.g., aluminum) or plastic sheet (plate) which secures the mechanical protection, and the heat dissipation.

Further, since the battery module case should have insulation properties in order to maintain performance and secure electrical stability of the battery module, it may also include an electrical insulation coating layer.

For example, Korean Patent Laid-Open Publication No. 10-2012-0051475 discloses a battery module including a battery module case, however, it did not provide an alternative idea to solve the above-described problems.

PRIOR ART DOCUMENT

Patent Document

Korean Patent Laid-Open Publication No. 10-2012-0051475

SUMMARY OF THE INVENTION

One object of the present invention is to provide a battery housing having excellent mechanical, thermal and electrical stabilities.

Another object of the present invention is to provide a battery system having excellent mechanical, thermal and electrical stabilities.

To achieve the above objects, according to an aspect of the present invention, there is provided a battery housing including: a bottom part; and a first sidewall part and a second sidewall part, wherein the first and second sidewall parts are connected to the bottom part and which face each other, wherein a first piece of any of the bottom part, the first sidewall part and the second sidewall part includes a carbon fiber reinforced plastic (CFRP) sheet, and a second piece of any of the bottom part, the first sidewall part and the second sidewall part includes a glass fiber reinforced plastic (GFRP) sheet.

In one embodiment, the bottom part may include the CFRP sheet, and at least one of the first sidewall part and the second sidewall part may include the GFRP sheet.

In one embodiment, the CFRP sheet may have a thermal conductivity ranging from 20 W/m·K to 1,000 W/m·K.

In one embodiment, the CFRP sheet may include: at least one of carbon fibers having a length ranging from 1 to 50 mm and a carbon fiber fabric; and a matrix resin impregnated with the at least one of the carbon fibers and the carbon fiber fabric.

In one embodiment, the CFRP sheet may include: a first CFRP sheet including carbon fibers having a length ranging from 1 to 50 mm and a first matrix resin impregnated with the carbon fibers; and a second CFRP sheet including a carbon fiber fabric and a second matrix resin impregnated with the carbon fiber fabric.

In one embodiment, a ratio of a thickness of the second CFRP sheet to a thickness of the first CFRP sheet may range from 0.1 to 2.

In one embodiment, the first matrix resin and the second matrix resin may include the same resin, and may be integrally combined.

In one embodiment, the GFRP sheet may have a dielectric breakdown voltage ranging from 10 kV/mm to 1,000 kV/mm.

In one embodiment, the GFRP sheet may include: at least one of glass fibers having a length ranging from 1 to 50 mm, and a glass fiber fabric; and a matrix resin impregnated with the at least one of the glass fibers and the glass fiber fabric.

In one embodiment, the GFRP sheet may include: a first GFRP sheet including glass fibers having a length ranging from 1 to 50 mm and a first matrix resin impregnated with the glass fibers; and a second GFRP sheet including a glass fiber fabric and a second matrix resin impregnated with the glass fiber fabric.

In one embodiment, a ratio of a thickness of the second GFRP sheet to a thickness of the first GFRP sheet may range from 0.1 to 2.

In one embodiment, the first matrix resin and the second matrix resin may include the same resin, and may be integrally combined.

According to another aspect of the present invention, there is provided a battery system including: the battery housing; and a plurality of battery cells housed in the battery housing.

In one embodiment, the battery housing may further include a cover part connected to the first sidewall part and the second sidewall part, and the cover part faces the bottom part, and wherein the cover part may include the CFRP sheet or the GFRP sheet.

In one embodiment, a ratio of a thickness of the first sidewall part to a thickness of the bottom part may range from 0.1 to 2, a ratio of a thickness of the second sidewall part to the thickness of the bottom part may range from 0.1 to 2.

In one embodiment, the bottom part may include the CFRP sheet, and at least one of the first sidewall part and the second sidewall part may include the GFRP sheet.

In one embodiment, the battery system may further include a cooling device disposed on an outer surface of the bottom part.

According to exemplary embodiments of the present invention, it is possible to provide a battery housing having improved mechanical, thermal and electrical stabilities.

According to exemplary embodiments of the present invention, it is possible to provide a battery system having the improved mechanical, and thermal stabilities (e.g., cooling performance) as well as electrical stability (e.g., insulating performance).

BRIEF DESCRIPTION OF THE DRAWINGS

The above and other objects, features and other advantages of the present invention will be more clearly understood from the following detailed description taken in conjunction with the accompanying drawings, in which:

FIG. 1 is a perspective view of a battery module according to exemplary embodiments;

FIG. 2 is an exploded perspective view of the battery module according to exemplary embodiments;

FIG. 3 is a cross-sectional view of a carbon fiber reinforced plastic (CFRP) sheet according to exemplary embodiments; and FIG. 4 is a cross-sectional view of a glass fiber reinforced plastic (GFRP) sheet according to exemplary embodiments.

DETAILED DESCRIPTION OF THE INVENTION

According to exemplary embodiments of the present invention, there are provided a battery housing including a carbon fiber reinforced plastic (CFRP) sheet and a glass fiber reinforced plastic (GFRP) sheet, and a battery system including the battery housing.

Configurations described in the embodiments and illustrated in the drawings of the present disclosure are only preferred examples of the invention, and diverse modifications capable of replacing the embodiments and drawings of the present disclosure may be possible at a time of filing the present application.

For example, the battery housing may be applied to a battery module case, a battery pack case, a battery system case and the like.

Ordinal numbers such as "first" and "second" used herein are used for the purpose of distinguishing one component from other components.

Hereinafter, an embodiment in which the battery housing according to exemplary embodiments of the present invention is applied to a battery module case will be described. However, the following contents are merely an example for the convenience of description, and it is not limited thereto the case in which the battery housing of the present invention is applied to the battery module case.

Battery Module and Battery Module Case

FIG. 1 is a perspective view of a battery module according to exemplary embodiments, and FIG. 2 is an exploded perspective view of the battery module according to exemplary embodiments.

A battery module 10 according to exemplary embodiments may include battery cells 200 and a battery module case 100.

The battery module case 100 may include a bottom part 110, and a first sidewall part 120 and a second sidewall part 130 which are connected to the bottom part. 110, and face each other.

For example, the wording "being connected to" may mean that a first component and a second component are connected with each other by bonding, thermal fusion bonding, welding, fitting or the like. Alternatively, the wording "being connected to" may also mean that the first component and the second component are connected with each other by a third component such as a connection part.

In one embodiment, the battery module case 100 may further include a cover part 160 connected to the first sidewall part 120 and the second sidewall part 130, and facing the bottom part 110.

In one embodiment, the battery module case 100 may further include a third sidewall part 140 and a fourth sidewall part 150 connected to the bottom part 110, and facing each other.

For example, each of the battery cells 200 may include an electrode lead 210. For example, the third sidewall part 140 or the fourth sidewall part 150 may be present in a direction in which the electrode lead 210 protrudes.

For example, when the electrode leads 210 are present at both ends of the battery cell (that is, a cathode lead and an anode lead protrude in directions opposite to each other), the third sidewall part 140 may be present in a direction in which the cathode lead protrudes, and the fourth sidewall part 150 may be present in a direction in which the anode lead protrudes.

For example, the battery module 10 may further include circuit parts 145 and 155 which electrically connect the battery cells 200. For example, the circuit parts 145 and 155 may respectively include a bus bar (not illustrated) which electrically connects the electrode leads 210 with each other.

For example, the first circuit part 145 may be disposed between the third sidewall part 140 and the battery cells 200. In addition, the second circuit part 155 may be disposed between the fourth sidewall part 150 and the battery cells 200.

In one embodiment, at least one of the bottom part 110, the first sidewall part 120 and the second sidewall part 130 may include a carbon fiber reinforced plastic (CFRP) sheet. In this case, mechanical properties (e.g., tensile strength) and thermal conductivity of the battery module case may be improved. Accordingly, at is possible to prevent breakage of the battery module due to an external mechanical shock and an excessive increase in the temperature of inside the battery module.

In another embodiment, at least one of the bottom part 110, the first sidewall part 120 and the second sidewall part 130 may include a glass fiber reinforced plastic (GFRP) sheet. In this case, mechanical properties and insulating performance of the battery module case may be improved. Thereby, it is possible to prevent breakage of the battery module due to an external mechanical shock, and improve electrical stability of the battery module.

In some embodiments, any one of the bottom part 110, the first sidewall part 120 and the second sidewall part 130 may include the CFRP sheet, and another of the bottom part 110, the first sidewall part 120 and the second sidewall part 130 may include the GFRP sheet. In this case, all the mechanical properties, cooling performance, and insulating performance of the battery module case may be improved.

In some embodiments, the cover part 160 may include the CFRP sheet or the GFRP sheet.

In some embodiments, the bottom part 110, the first sidewall part 120, the second sidewall part 130 and the cover part 160 may selectively include the CFRP sheet and the GFRP sheet. For example, when these parts include the CFRP sheet, they may not include the GFRP sheet.

For example, the respective walls (the bottom part, the first sidewall part, the second sidewall part, the cover part, etc.) of the battery module case 100 may serve as a cooling part to prevent an excessive increase in the temperature of the battery module, or as an insulation part to insulate from an outside.

In some embodiments, the battery module 10 may further include, for example, a cooling device (not illustrated) disposed (e.g., on an outer surface) of at least one of the walls of the battery module case 100. For example, the cooling device may include a cooling passage. For example, the "outer surface" may refer to a surface in contact with an external space of the battery module case 100.

In some embodiments, the cooling device may be provided on an outer surface of a wall serving as the cooling part among the walls of the battery module case 100 (hereinafter, abbreviated as a cooling part-wall). For example, the cooling part-wall and the cooling device may be in direct or indirect contact with each other.

In some embodiments, the cooling part-wall may include the CFRP sheet. For example, the cooling device may be provided on (e.g., the outer surface of) the CFRP sheet. In this case, the mechanical properties and cooling performance of the battery module case may be further improved.

In some embodiments, a wall serving as the insulation part among the walls of the battery module case 100 (hereinafter, abbreviated as an insulation part-wall) may include the GFRP sheet. In this case, the mechanical properties and insulating performance of the battery module case may be further improved.

Conventionally, the insulation part-wall includes a metal sheet (e.g., aluminum sheet) and an insulation coating layer. However, according to an embodiment of the present invention, the insulation part-wall includes the GFRP sheet, such that it may not include a separate metal sheet and/or an insulation coating layer. Accordingly, it may be more advantageous in light weight of the battery module case.

For example, if the cooling part-wall includes a GFRP sheet, the cooling performance is reduced, such that an increase in the temperature of the battery module cannot be effectively prevented. In addition, for example, if the insulation part-wall includes a CFRP sheet, the insulating performance is reduced, such that the electrical stability of the battery module may be deteriorated.

In some embodiments, the cooling part-wall includes the CFRP sheet, and may not include the GFRP sheet. In addition, the insulation part-wall includes the GFRP sheet, and may not include the CFRP sheet. In this case, effects of each wall may be further improved.

In some embodiments, the bottom part 110 may serve to support the battery cells 200 and serve as a cooling part. For example, the cooling device may be provided on (e.g., the outer surface of; the bottom part 110. For example, the bottom part 110 may include the CFRP sheet.

In some embodiments, the bottom part 110 includes the CFRP sheet, and may not include the GFRP sheet.

In some embodiments, at least one of the first sidewall part 120 and the second sidewall part 130 may serve as an insulation part. For example, at least one of the first sidewall part 120 and the second sidewall part 130 may include the GFRP sheet. In some embodiments, each of the first sidewall part 120 and the second sidewall part 130 may include the GFRP sheet.

In some embodiments, the first sidewall part 120 and the second sidewall part 130 include the GFRP sheet, and may not include the CFRP sheet.

In one embodiment, a ratio of a thickness of the first sidewall part to a thickness of the bottom part may be 0.1 to 2, 0.5 to 1.75, or 0.75 to 1.25. In addition, a ratio of a thickness of the second sidewall part to the thickness of the bottom part may be 0.1 to 2, 0.5 to 1.75, or 0.75 to 1.25. In this case, it is possible to implement a battery module case having excellent insulating performance and cooling performance.

For example, the ratio of the thickness of the GFRP sheet to the thickness of the CFRP sheet may be 0.1 to 2, 0.5 to 1.75, or 0.75 to 1.25.

CFRP Sheet

The CFRP sheet may include carbon fibers and a matrix resin impregnated with the carbon fibers.

In one embodiment, the CFRP sheet may have a tensile strength of 150 MPa or more. For example, the tensile strength may be measured according to ISO-527.

In some embodiments, the tensile strength of the CFRP sheet may be 150 to 5,000 MPa, 250 to 4,500 MPa, or 300 to 4,000 mPa.

In one embodiment, the CFRP sheet may have a thermal conductivity of 10 W/m·K or more. Preferably, the thermal conductivity of the CFRP sheet may be 20 W/m·K or more, preferably 30 W/m·K or more, and more preferably 50 W/m·K or more. Within the above range, it is possible to further improve the cooling performance of the battery module case. Thereby, it is possible to effectively prevent an excessive increase in the temperature of the battery module. For example, the thermal conductivity may be measured according to ASTM E1416.

In some embodiments, the thermal conductivity of the CFRP sheet may be 50 to 1,000 W/m·K, or 85 to 800 W/m·K. Within the above range, it is possible to further improve the cooling performance of the battery module case.

In one embodiment, the CFRP sheet may include at least one of carbon fibers A (not illustrated) having a length of 1 to 50 mm and a carbon fiber fabric B (not illustrated); and a matrix resin impregnated with at least one of the carbon fibers A and the carbon fiber fabric B. For example, when the CFRP sheet includes the carbon fiber fabric B, the mechanical properties and cooling performance of the battery module case may be further improved.

In some embodiments, the carbon fiber A may have a length of 1 to 50 mm, 5 to 40 mm, 8 to 30 mm, or 10 to 25 mm.

In some embodiments, the carbon fiber A may have diameter of 1 to 100 μm, or 5 to 50 μm.

In some embodiments, a content of the carbon fiber A in the CFRP sheet may be 20 to 80% by weight ('wt. %'), or 30 to 70 wt. %.

For example, the carbon fiber fabric B may refer to a fabric formed by weaving a plurality of carbon fiber bundles.

For example, a single carbon fiber forming the carbon fiber bundle may have a diameter of 1 to 100 μm, or 5 to 50 μm.

For example, the carbon fiber fabric B may have a shape including a biaxial woven shape, a triaxial woven shape, a knitted shape, a multiaxial multilayer warp knitted shape, a 3D cylindrical shape, a 3D braided shape, a 3D orthogonal shape, an angle-interlock woven shape or the like.

In some embodiments, a content of the carbon fiber fabric B in the CFRP sheet may be 20 to 90 wt. %, 25 to 85 wt. %, or 30 to 80 wt. %.

In some embodiments, when the CFRP sheet includes both the carbon fiber A and the carbon fiber fabric B, the content of the carbon fiber A in the CFRP sheet may be 5 to 40 wt. %, and the content of the carbon fiber fabric B may be 5 to 45 wt. %.

For example, the matrix resin may include a thermoplastic resin or a thermosetting resin.

For example, the thermoplastic resin may include polyolefin (PO, for example, PE, PP, etc.), polyamide (PA, for example, nylon), polycarbonate (PC), polyphenylene sulfide (PPS), polyvinyl chloride (PVC), an acrylic resin, an acetal resin, thermoplastic polyester, polyimide (PI), polyphenylene oxide (PPO) and the like.

For example, the thermosetting resin may include a phenol resin, an epoxy resin, a melamine resin, a urea resin, thermosetting polyester, polyurethane and the like.

In some embodiments, the matrix resin may include PP in terms of light weight. Alternatively, the matrix resin may include an epoxy resin in terms of mechanical properties.

For example, the CFRP sheet may be prepared by dispersing the carbon fiber A in a molten thermoplastic resin (or thermosetting resin before curing), followed by molding the same into a sheet shape.

For example, the CFRP sheet may be prepared by impregnating the carbon fiber fabric B in a molten thermoplastic resin (or thermosetting resin before curing). Alternatively, the CFRP sheet may be prepared by disposing a thermoplastic resin sheet on the carbon fiber fabric B, and thermally compressing the resin to be impregnated therein.

For example, the CFRP sheet may be prepared by coating the surface of the carbon fiber bundle with a thermoplastic resin, then thermally compressing and fusion bonding the coated carbon fiber bundle. Alternatively, the CFRP sheet may be prepared by thermally compressing and fusion bonding a bundle composed of single fibers having a core-shell structure including a single carbon fiber core and a thermoplastic resin shell.

In one embodiment, as shown in FIG. 3, the CFRP sheet may include a first CFRP sheet 50 including the carbon fiber A and a first matrix resin 55; and a second CFRP sheet 60 including the carbon fiber fabric B and a second matrix resin 65. In this case, the mechanical properties and cooling performance of the battery module case may be further improved.

In some embodiments, the first CFRP sheet 50 and the second CFRP sheet 60 may be laminated in contact with each other.

In some embodiments, the CFRP sheet may have a total of two or more layers or three or more layers in which the first CFRP sheet 50 and the second CFRP sheet 60 are alternately laminated. For example, the first CFRP sheet 50 and the second CFRP sheet 60 may be adhered by an adhesive layer or may be adhered by thermally fusion bonding the same.

In some embodiments, a ratio of a thickness of the second CFRP sheet 60 to a thickness of the first CFRP sheet 50 may be 0.1 to 2, 0.5 to 1.75, or 0.75 to 1.25. Within the above range, the mechanical properties and cooling performance of the battery module case may be further improved.

For example, the first matrix resin 55 and the second matrix resin 65 may be the same as or different from each other.

In some embodiments, the first matrix resin 55 and the second matrix resin 65 may include the same resin, and may be a combined monolithic body.

For example, the matrix resins may be integrally formed with each other by thermally compressing the first CFRP sheet 50 and the second CFRP sheet 60 which include the same matrix resin as each other to allow the matrix resins to be thermally fusion bonded thereto. In this case, the mechanical properties of the battery module case may be more excellent.

GFRP Sheet

The GFRP sheet may include glass fibers and a matrix resin impregnated with the glass fibers.

In one embodiment, the GFRP sheet may have a tensile strength of 100 MPa or more. For example, the tensile strength may be measured according to ISO-527.

In some embodiments, the GFRP sheet may have a dielectric breakdown voltage of 10 kV/mm or more, preferably 20 kv/mm or more, and more preferably 30 kV/mm or more. For example, the dielectric breakdown voltage may be measured according to ISO-60243. Within the above range, the insulating performance of the battery module case may be further improved.

In some embodiments, the dielectric breakdown voltage of the CFRP sheet may be 10 to 100 kV/mm, 20 to 100 kV/mm, or 30 to 100 kV/mm. Within the above range, the insulating performance of the battery module case may be further improved.

In one embodiment, the GFRP sheet may include at least one of glass fibers C (not illustrated) having a length of 1 to 50 mm, and a glass fiber fabric D (not illustrated); and a matrix resin impregnated with at least one of the glass fibers C and the glass fiber fabric D. When the GFRP sheet includes the glass fiber fabric D, the mechanical properties and insulating performance of the battery module case may be further improved.

In some embodiments, the glass fiber C may have a length of 1 to 50 mm, 5 to 40 mm, 8 to 30 mm, or 10 to 25 mm.

In some embodiments, the glass fiber C may have a diameter of 1 to 100 μm, or 5 to 50 μm.

In some embodiments, a content of the glass fiber C in the GFRP sheet may be 20 to 80 wt. %, or 30 to 70 wt. %.

For example, the glass fiber fabric D may refer to a fabric formed by weaving a plurality of glass fiber bundles.

For example, a single glass fiber forming the Glass fiber bundle may have a diameter of 1 to 100 μm, or 5 to 50 μm.

For example, the glass fiber fabric D may have a shape including a biaxial woven shape, a triaxial woven shape, a knitted shape, a multiaxial multilayer warp knitted shape, a 3D cylindrical shape, a 3D braided shape, a 3D orthogonal shape, an angle-interlock woven shape or the like.

In some embodiments, a content of the glass fiber fabric D in the GFRP sheet may be 20 to 90 wt. %, 25 to 85 wt. %, or 30 to 80 wt. %.

In some embodiments, when the GFRP sheet includes both the glass fiber C and the glass fiber fabric D, the content of the glass fiber C in the GFRP sheet may be 5 to 40 wt. %, and the content of the glass fiber fabric D may be 5 to 45 wt. %.

For example, the matrix resin may include a thermoplastic resin or a thermosetting resin. For the thermoplastic resin and the thermosetting resin, the above-described contents may be applied to this sheet as it is.

For example, the GFRP sheet may be prepared by dispersing the glass fiber C in a molten thermoplastic resin (or thermosetting resin before curing), followed by molding the same into a sheet shape.

For example, the GFRP sheet may be prepared by impregnating the glass fiber fabric D with molten thermoplastic resin (or thermosetting resin before curing). Alternatively, the GFRP sheet may be prepared by disposing a thermoplastic resin sheet on the glass fiber fabric D, and thermally compressing the resin to be impregnated therein.

For example, the GFRP sheet may be prepared by coating the surface of the glass fiber bundle with a thermoplastic resin, then thermally compressing and fusion bonding the coated glass fiber bundle. Alternatively, the GFRP sheet may be prepared by thermally compressing and fusion bonding a bundle composed of single fibers having a core-shell structure including a single glass fiber core and a thermoplastic resin shell.

In one embodiment, as shown in FIG. 4, the GFRP sheet may include: a first GFRP sheet 70 including the glass fiber C and a first matrix resin 75; and a second GFRP sheet 80 including the glass fiber fabric D and a second matrix resin 85. In this case, the mechanical properties and insulating performance of the battery module case may be further improved.

In some embodiments, the first GFRP sheet 70 and the second GFRP sheet 80 may be laminated in contact with each other.

In some embodiments, the GFRP sheet may have a total of two or more layers or three or more layers in which the first GFRP sheet 70 and the second GFRP sheet 80 are alternately laminated. For example, the first GFRP sheet 70 and the second GFRP sheet 80 may be adhered by an adhesive layer or may be adhered by thermally fusion bonding the same.

In some embodiments, a ratio of a thickness of the second GFRP sheet 80 to a thickness of the first GFRP sheet 70 may be 0.1 to 2, 0.5 to 1.75, or 0.75 to 1.25. Within the above range, the mechanical properties and insulating performance of the battery module case may be further improved.

For example, the first matrix resin 75 and the second matrix resin 85 may be the same as or different from each other.

In some embodiments, the first matrix resin 75 and the second matrix resin 85 may include the same resin, and may be a combined monolithic body.

For example, the matrix resins may be integrally formed with each other by thermally compressing the first GFRP sheet 70 and the second GFRP sheet 80 which include the same matrix resin as each other to allow the matrix resins to be thermally fusion bonded thereto. In this case, the mechanical properties of the battery module case may be more excellent.

What is claimed is:

1. A battery housing comprising:
   a bottom part; and
   a first sidewall part and a second sidewall part, wherein the first and the second sidewall parts are connected to the bottom part and which face each other,
   wherein the bottom part comprises a carbon fiber reinforced plastic (CFRP) sheet and does not include a glass fiber reinforced plastic (GFRP) sheet, and
   at least one of the first sidewall part and the second sidewall part comprises the GFRP sheet, and does not include the CFRP sheet.

2. The battery housing according to claim 1, wherein the CFRP sheet has a thermal conductivity ranging from 20 W/m·K to 1,000 W/m·K.

3. The battery housing according to claim 1, wherein the CFRP sheet comprises:
   at least one of carbon fibers having a length ranging from 1 to 50 mm and a carbon fiber fabric; and
   a matrix resin impregnated with the at least one of the carbon fibers and the carbon fiber fabric.

4. The battery housing according to claim 1, wherein the CFRP sheet comprises:
   a first CFRP sheet comprising carbon fibers having a length ranging from 1 to 50 mm and a first matrix resin impregnated with the carbon fibers; and
   a second CFRP sheet comprising a carbon fiber fabric and a second matrix resin impregnated with the carbon fiber fabric.

5. The battery housing according to claim 4, wherein a ratio of a thickness of the second CFRP sheet to a thickness of the first CFRP sheet ranges from 0.1 to 2.

6. The battery housing according to claim 4, wherein the first matrix resin and the second matrix resin comprise the same resin, and are integrally combined.

7. The battery housing according to claim 1, wherein the GFRP sheet has a dielectric breakdown voltage ranging from 10 kV/mm to 100 kV/mm.

8. The battery housing according to claim 1, wherein the GFRP sheet comprises:
   at least one of glass fibers having a length ranging from 1 to 50 mm and a glass fiber fabric; and
   a matrix resin impregnated with the at least one of the glass fibers and the glass fiber fabric.

9. The battery housing according to claim 1, wherein the GFRP sheet comprises:
   a first GFRP sheet comprising glass fibers having a length ranging from 1 to 50 mm and a first matrix resin impregnated with the glass fibers; and
   a second GFRP sheet comprising a glass fiber fabric and a second matrix resin impregnated with the glass fiber fabric.

10. The battery housing according to claim 9, wherein a ratio of a thickness of the second GFRP sheet to a thickness of the first GFRP sheet ranges from 0.1 to 2.

11. The battery housing according to claim 9, wherein the first matrix resin and the second matrix resin comprise the same resin, and are integrally combined.

12. A battery system comprising:
    a battery housing having a bottom part, a first sidewall part, and a second sidewall part, wherein the first sidewall part and the second sidewall part are connected to the bottom part and face each other; and
    a plurality of battery cells housed in the battery housing, wherein
a first piece of any of the bottom part, the first sidewall part and the second sidewall part comprises a carbon fiber reinforced plastic (CFRP) sheet, and
a second piece of any of the bottom part, the first sidewall part and the second sidewall part comprises a glass fiber reinforced plastic (GFRP) sheet,
wherein the bottom part comprises a carbon fiber reinforced plastic (CFRP) sheet, and at least one of the first sidewall part and the second sidewall part comprises the GFRP sheet, and does not include the CFRP sheet.

13. The battery system according to claim 12, wherein the battery housing further comprises a cover part connected to the first sidewall part and the second sidewall part, and the cover part faces the bottom part, and
wherein the cover part comprises the CFRP sheet or the GFRP sheet.

14. The battery system according to claim 12, wherein
a ratio of a thickness of the first sidewall part to a thickness of the bottom part ranges from 0.1 to 2,
a ratio of a thickness of the second sidewall part to the thickness of the bottom part ranges from 0.1 to 2.

15. The battery system according to claim 12, wherein the bottom part comprises the CFRP sheet, and
at least one of the first sidewall part and the second sidewall part comprises the GFRP sheet.

16. The battery system according to claim 15, further comprising a cooling device disposed on an outer surface of the bottom part.

17. The battery system according to claim 12, wherein the CFRP sheet comprises:
a first CFRP sheet comprising carbon fibers having a length ranging from 1 to 50 mm and a first matrix resin impregnated with the carbon fibers; and
a second CFRP sheet comprising a carbon fiber fabric and a second matrix resin impregnated with the carbon fiber fabric,
wherein the CFRP sheet has a thermal conductivity ranging from 20 W/m·K to 1,000 W/m·K.

18. The battery system according to claim 12, wherein the GFRP sheet comprises:
a first GFRP sheet comprising glass fibers having a length ranging from 1 to 50 mm and a first matrix resin impregnated with the glass fibers; and
a second GFRP sheet comprising a glass fiber fabric and a second matrix resin impregnated with the glass fiber fabric,
wherein the GFRP sheet has a dielectric breakdown voltage ranging from 10 kV/mm to 100 kV/mm.

* * * * *